(12) United States Patent
Awano

(10) Patent No.: US 9,610,719 B2
(45) Date of Patent: Apr. 4, 2017

(54) FASTENING RESIN STRUCTURE AND METHOD FOR MANUFACTURING THE SAME

(71) Applicant: HONDA MOTOR CO., LTD., Minato-ku, Tokyo (JP)

(72) Inventor: Katsuyuki Awano, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/721,626

(22) Filed: May 26, 2015

(65) Prior Publication Data

US 2015/0258720 A1 Sep. 17, 2015

Related U.S. Application Data

(62) Division of application No. 14/195,963, filed on Mar. 4, 2014, now abandoned.

(30) Foreign Application Priority Data

Mar. 4, 2013 (JP) .................. 2013-041572

(51) Int. Cl.
  *E04C 1/00* (2006.01)
  *B29C 45/14* (2006.01)
  (Continued)

(52) U.S. Cl.
  CPC ........ *B29C 45/14795* (2013.01); *B29D 99/00* (2013.01); *B62D 21/11* (2013.01);
  (Continued)

(58) Field of Classification Search
  CPC .... B62D 29/002; B62D 21/152; B62D 21/11; B62D 29/041; E04C 5/07; B29D 99/00;
  (Continued)

(56) References Cited

U.S. PATENT DOCUMENTS 3,019,865 A * 2/1962 Rohe .......................... 52/787.12
4,083,491 A * 4/1978 Hill ............................... 238/98
(Continued)

FOREIGN PATENT DOCUMENTS

CN 101793218 A 8/2010
CN 102396023 A 3/2012
(Continued)

OTHER PUBLICATIONS

German Search Report, issued Nov. 13, 2014, in the corresponding parent DE Patent Application 10 2014 203 884.7 with the English translation thereof.
(Continued)

*Primary Examiner* — Basil Katcheves
(74) *Attorney, Agent, or Firm* — Carrier Blackman & Associates, P.C.; William D. Blackman; Jingli Wang

(57) ABSTRACT

A fastening resin structure includes a preformed resin member, a fastener-receiving part of metal configured to be fastened to another structure, the fastener-receiving part having a portion joined to the preformed resin member, a foam portion provided on and formed integrally with the portion of the fastener-receiving part which is joined to the preformed resin member, and a joining resin interposed between the preformed resin member and the foam portion and impregnated with the foam portion to thereby join the preformed resin member and the fastener-receiving part via the resin-impregnated foam portion.

12 Claims, 10 Drawing Sheets

(51) Int. Cl.
*B29D 99/00* (2010.01)
*E04C 5/07* (2006.01)
*F16B 43/00* (2006.01)
*B62D 21/11* (2006.01)
*B62D 29/04* (2006.01)
*B29K 705/00* (2006.01)
*B29L 31/00* (2006.01)

(52) U.S. Cl.
CPC .............. *B62D 29/041* (2013.01); *E04C 5/07* (2013.01); *F16B 43/00* (2013.01); *B29C 2045/14803* (2013.01); *B29K 2705/00* (2013.01); *B29K 2715/00* (2013.01); *B29K 2715/003* (2013.01); *B29L 2031/727* (2013.01); *Y10T 16/05* (2015.01)

(58) Field of Classification Search
CPC ..... B29C 45/14795; B29C 2045/14803; F16B 43/00; B29L 2031/727; Y10T 16/05; B29K 2715/003; B29K 2705/00; B29K 2715/00
USPC .................. 52/309.2, 309.8, 309.1, 309.4
See application file for complete search history.

(56) References Cited

U.S. PATENT DOCUMENTS

| | | | | |
|---|---|---|---|---|
| 4,759,000 | A * | 7/1988 | Reitz | 367/176 |
| 4,800,643 | A * | 1/1989 | Higgins | 29/458 |
| 5,082,405 | A * | 1/1992 | Witten | 411/82 |
| 5,240,543 | A * | 8/1993 | Fetterhoff et al. | 156/293 |
| 5,931,474 | A * | 8/1999 | Chang et al. | 277/316 |
| 6,122,877 | A * | 9/2000 | Hendrickson et al. | 52/520 |
| 6,298,633 | B1 * | 10/2001 | McCorkle et al. | 52/787.1 |
| 6,311,452 | B1 * | 11/2001 | Barz et al. | 296/207 |
| 6,601,802 | B1 * | 8/2003 | Howe | 248/58 |
| 7,592,059 | B2 * | 9/2009 | Lane et al. | 428/71 |
| 8,336,671 | B2 | 12/2012 | Kondo et al. | |
| 8,584,433 | B2 * | 11/2013 | Masuda | 52/787.1 |
| 2003/0090129 | A1 * | 5/2003 | Riley et al. | 296/203.03 |
| 2005/0145159 | A1 * | 7/2005 | Barsoum | 114/356 |
| 2008/0104902 | A1 * | 5/2008 | Ashelin et al. | 52/173.2 |
| 2011/0042353 | A1 | 2/2011 | Menoni et al. | |
| 2012/0055841 | A1 | 3/2012 | Flener et al. | |

FOREIGN PATENT DOCUMENTS

| | | |
|---|---|---|
| EP | 0170886 A1 | 2/1986 |
| EP | 0 594 131 A1 | 4/1994 |
| JP | 2007-290426 A | 11/2007 |

OTHER PUBLICATIONS

Office Action dated Dec. 3, 2015 corresponding to Chinese Patent Application No. 201410075637.7 and partial English translation.
Office Action issued in the corresponding Chinese Patent Application 201410075637.7, issue date of Feb. 3, 2017, with a partial English translation thereof.
Wang Zhu-tang et al., "Performance of foam aluminum and its production technology", Light Alloy Fabrication Technology, vol. 39, No. 10, pp. 10-21, Oct. 20, 2011.

* cited by examiner

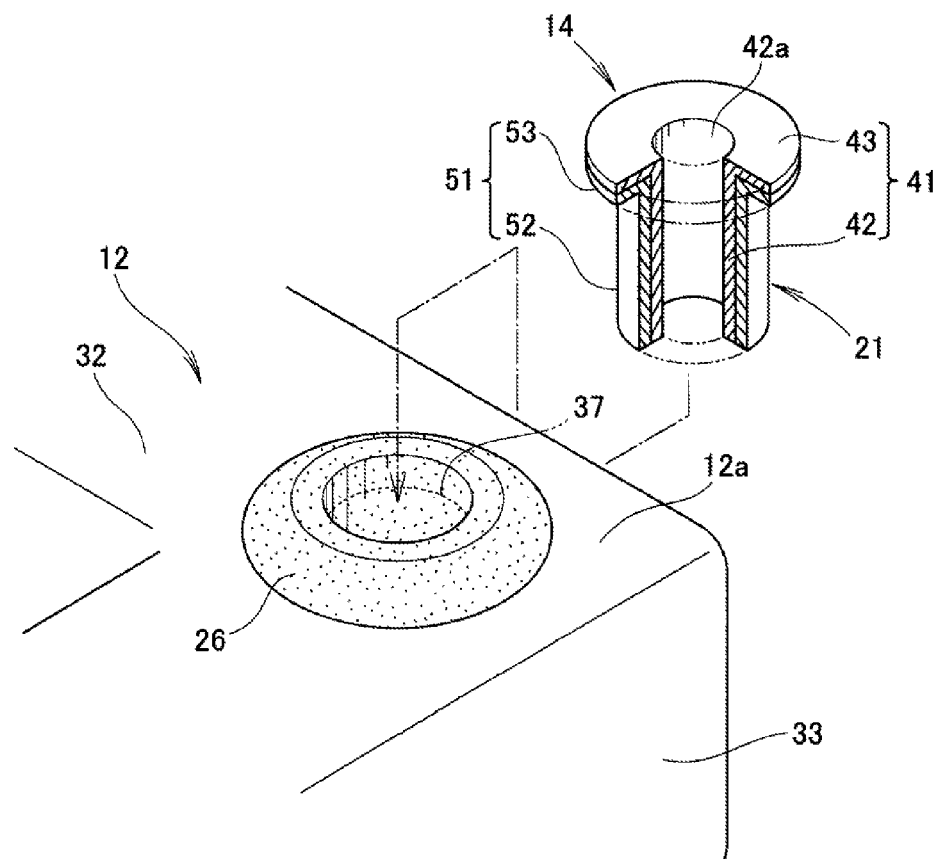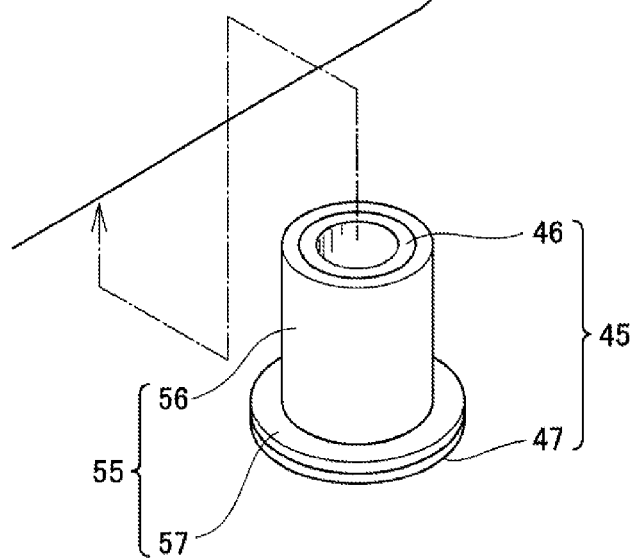
FIG.3

FASTENING RESIN STRUCTURE AND METHOD FOR MANUFACTURING THE SAME

CROSS-REFERENCES TO RELATED APPLICATIONS

This application is a divisional of U.S. patent application Ser. No. 14/195,963 filed on Mar. 4, 2014, which claims priority to Japanese Patent Application No. 2013-041572 filed Mar. 4, 2013. The entire disclosures of these applications are incorporated herein by reference.

FIELD OF THE INVENTION

The present invention relates to a fastening resin structure having a resin member and a metal part joined to the resin member, the metal part being capable of being fastened to another structure by means of fasteners.

BACKGROUND OF THE INVENTION

A well-known vehicle includes a fastening resin structure such as a dash panel or front pillar made from carbon fiber reinforced plastic (CFRP), and a front side member of aluminum alloy attached to the fastening resin structure by means of a bolt and a nut, as disclosed in JP-A-2007-290426.

The fastening resin structure disclosed in JP-A-2007-290426 includes a resin member, i.e., a dash panel and front pillar body made from carbon fiber reinforced plastic, and a metal collar joined to the resin member. The collar is a "to-be-fastened part" which is to be fastened to another member by means of fasteners such as a bolt and a nut, as is discussed below.

The to-be-fastened part is coaxial with a mounting hole formed through a front side member of aluminum alloy with a bolt passing through the mounting hole and the to-be-fastened part. The bolt is tightened with a nut to fasten the to-be-fastened part to the front side member so as to attach the front side member to the fastening resin structure.

As for the fastening resin structure disclosed in JP-A-2007-290426, the to-be-fastened part made of metal needs to be joined through an adhesive to the resin member for attachment of the aluminum-alloy-made front side member to the fastening resin structure.

Since carbon fiber reinforced plastic differs from the metal material in coefficient of linear thermal expansion, a change in temperature would generate a stress in the adhesive interposed between the resin member and the to-be-fastened part. Taking this into consideration, it is required that the adhesive maintain a joining strength (to firmly join the to-be-fastened part to the resin member) when a stress is generated in the adhesive due to the temperature change under a high or low temperature environment.

To ensure the maintenance of the joining strength of the adhesive, a joining area between the resin member and the collar may be enlarged. However, the enlargement of the joining area inevitably would make a size of the to-be-fastened part large and hence increase a weight of the fastening resin structure.

The large size of the to-be-fastened part requires a large space for placement of the to-be-fastened part in fastening the fastening resin structure to another structure. This is a hindrance to enhancement of the freedom to design.

SUMMARY OF THE INVENTION

An object of the present invention is to provide a fastening resin structure having a resin member and a to-be-fastened (or fastener-receiving) part downsized to lighten a weight of the fastening resin structure and maintain a joining strength to firmly join the resin member and the to-be-fastened part, the to-be-fastened part being capable of being placed in a small space in fastening the fastening resin structure to another structure.

Another object of the present invention is to provide a method of manufacturing the aforementioned fastening resin structure.

According to one aspect of the present invention, there is provided a fastening resin structure including a resin member and a to-be-fastened part of metal joined to the resin member, the to-be-fastened part being capable of being fastened to another structure through a fastener, the fastening resin structure comprising: a foam portion made from a foamable material, the foam portion being formed in the to-be-fastened part and joined to the resin member, wherein the foam portion is impregnated with a resin to join the foam portion to the resin member.

The foam portion is formed in the to-be-fastened part of metal, and is impregnated with the resin (filling pores of the foam portion) to join the foam portion to the resin member. That is, the resin-impregnated foam portion is an intermediate portion interposed between the to-be-fastened part and the resin member.

Since this intermediate portion contains both the foam portion and the resin, a coefficient of linear thermal expansion of the intermediate portion is set to be between a coefficient of linear thermal expansion of the foam portion and a coefficient of linear thermal expansion of resin (i.e., between a coefficient of linear thermal expansion of the to-be-fastened part and a coefficient of linear thermal expansion of the resin member), such that the intermediate portion mitigates a concentrated stress produced at an interface between the resin member and the to-be-fastened part due to change in temperature under a high or low temperature condition.

Inside the foam portion is formed a multiplicity of pores. Due to the pores, the foam portion has an increased surficial area. The increased surficial area is joined to the resin when the pores are filled with the resin. That is, it is possible to provide the foam portion with the increased area joined to the resin without enlarging the to-be-fastened part.

As discussed above, the foam portion (intermediate portion), interposed between the resin member and the to-be-fastened part, mitigates the concentrated stress produced at the interface between the resin member and the to-be-fastened part, and has the increased area joined to the resin.

That is, with the increased area of the foam portion joined to the resin member through the resin, the resin has a sufficient joining strength (to firmly join the foam portion to the resin member). This allows for downsizing of the metallic to-be-fastened part to make the fastening resin structure lightweight.

The to-be-fastened part downsized can be placed in a small space when the fastening resin structure is to be fastened to another structure. Since such a small space for placement of the downsized to-be-fastened part is easy to secure, the degree of freedom to design can be increased.

According to a second aspect of the present invention, there is provided a method for manufacturing a fastening resin structure including a resin member and a to-be-fastened part of metal joined to the resin member, the to-be-fastened part being capable of being fastened to another structure through a fastener, the method comprising the steps of forming, in the to-be-fastened part, a foam portion made of a foamable material; placing, in a mold, the to-befastened part having the foam portion formed therein; and injecting a resin into a cavity of the mold to impregnate the foam portion with the resin to join the foam portion to the resin member.

The foam portion is formed in the to-be-fastened part, and the to-be-fastened part having the foam portion formed therein is placed in the mold. After the placement, the resin is injected into the cavity of the mold to impregnate the foam portion with the resin for joining the foam portion to the resin member.

Since the foam portion is formed in the to-be-fastened part, it is possible to join the to-be-fastened part to the resin member through the foam portion by the mere injection of the resin into the cavity. In this easy way, the fastening resin structure can be manufactured.

Since the fastening resin structure can be easily manufactured, as discussed above, the cost of the structure may be low.

BRIEF DESCRIPTION OF THE DRAWINGS

Certain preferred embodiments of the present invention will hereinafter be described in detail, by way of example only, with reference to the accompanying drawings, in which:

FIG. 3 is an exploded perspective view of a first collar and a metal foam portion in the first embodiment;

DETAILED DESCRIPTION OF THE PREFERRED EMBODIMENTS

A discussion is made as to a fastening resin structure 10 and a method for manufacturing the structure 10 in a first embodiment of the present invention.

Figure 1:
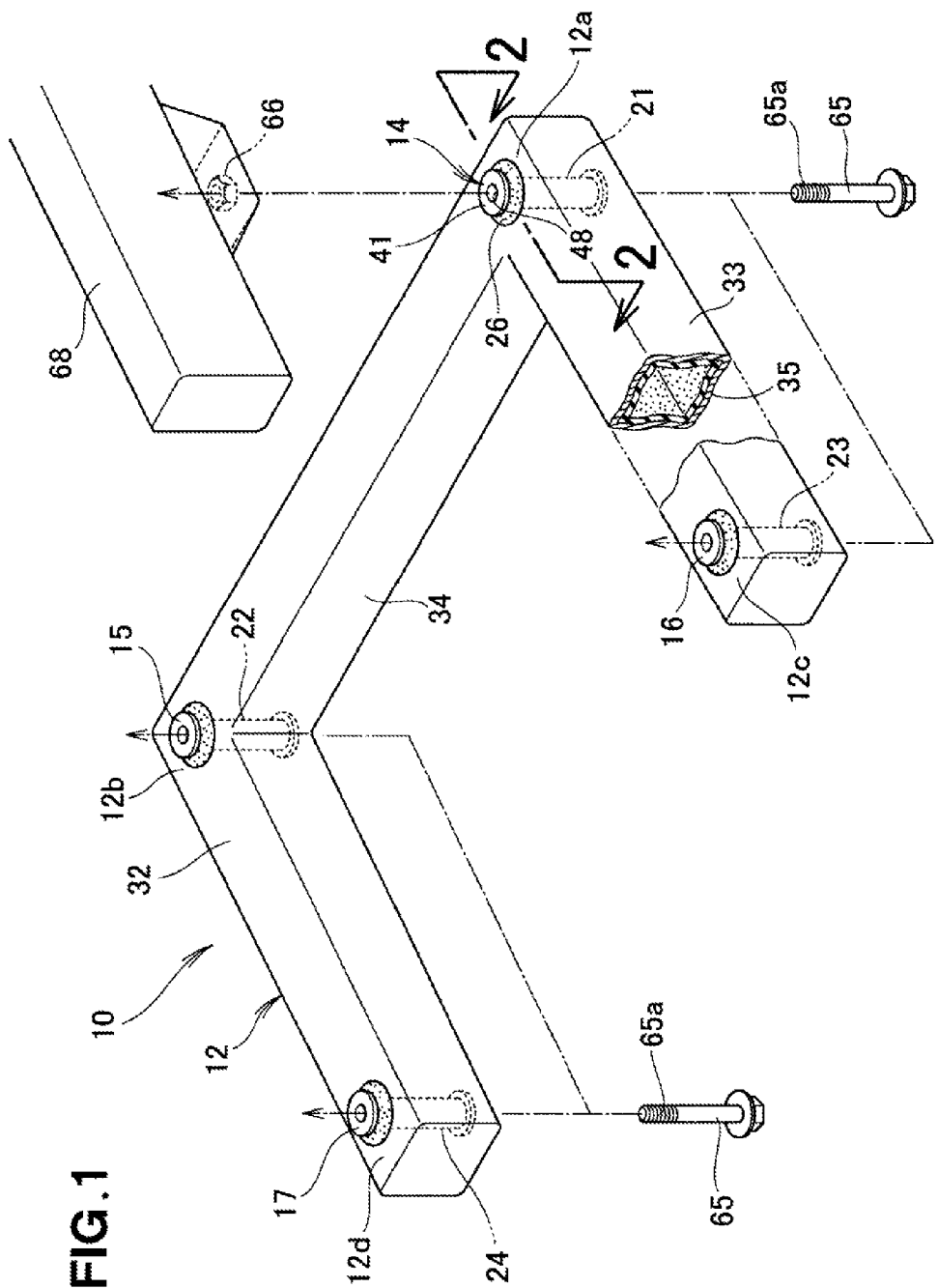
FIG. 1 is a perspective view of a fastening resin structure in a first embodiment of the present invention.

As shown in FIG. 1, the fastening resin structure 10 is, for example, a vehicular sub-frame which is generally U-shaped as viewed in plan and adapted to support a power plant.

An exemplary power plant is an engine and transmission unit which is a unitary structure of an engine and a transmission.

The fastening resin structure 10 includes a fiber reinforced resin member 12 which is generally U-shaped, first and second collars (to-be-fastened, or fastener-receiving, parts) 14, 15 in opposite corners 12a, 12b of the fiber reinforced resin member 12, and third and fourth collars (to-be-fastened parts) 16, 17 in opposite end portions 12c, 12d of the fiber reinforced resin member 12.

The fastening resin structure 10 further includes first to fourth metal foam portions 21, 22, 23, 24 formed in the first to fourth collars 14, 15, 16, 17, respectively, and a resin portion 26 joining the first to fourth metal foam portions 21, 22, 23, 24 to the fiber reinforced resin member 12.

The fiber reinforced resin member 12 is formed of a fiber reinforced resin and is of generally square-shaped, closed cross-section. The fiber reinforced resin member 12 includes a top portion 32 which is generally U-shaped as viewed in plan, an outer wall portion 33 extending generally in the form of a U-shape as viewed in plan, an inner wall portion 34 extending generally in the form of a U-shape as viewed in plan, and a bottom portion 35 which is generally U-shaped as viewed in plan.

The top, outer wall, inner wall and bottom portions 32, 33, 34, 35 define a generally square-shaped, closed cross-section. The top, outer wall, inner wall and bottom portions 32, 33, 34, 35 are made from a carbon fiber reinforced plastic (CFRP) formed by a continuous fiber mat (e.g., a carbon fiber mat) and a thermoplastic resin sheet laminated on opposite sides of the mat.

Figure 2:
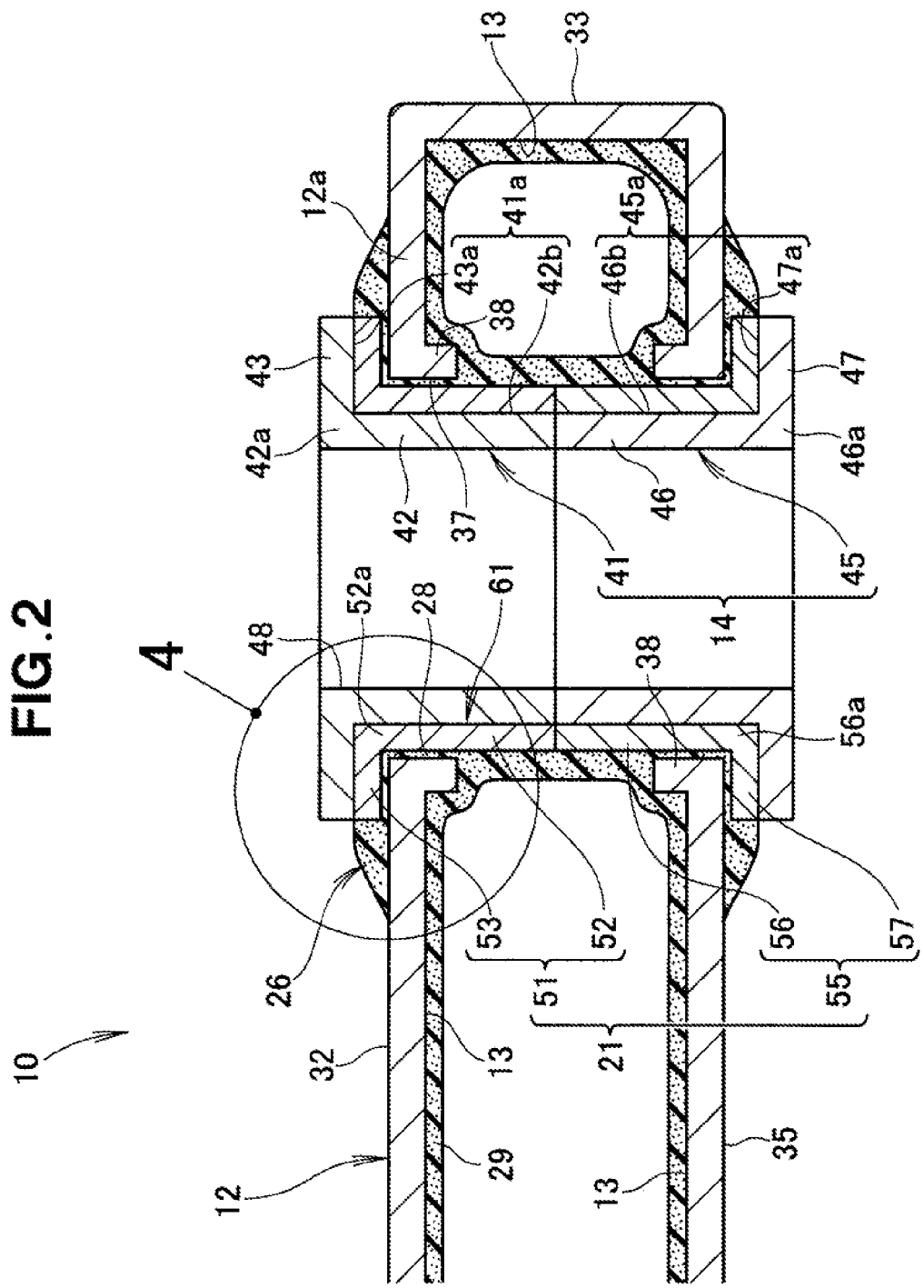
FIG. 2 is a cross-sectional view taken along line 2-2 of FIG. 1.

As shown in FIGS. 1 and 2, the opposite corners 12a, 12b and opposite end portions 12c, 12d of the fiber reinforced resin member 12 have first to fourth mounting holes formed therethrough. It is noted that only the first one 37 formed through the corner 12a is shown. The first to fourth metal foam portions 21 to 24 are inserted through the first to fourth mounting holes, respectively.

The first to fourth collars 14 to 17 are like parts, and hence a detailed discussion is made below only as to the first collar 14 and discussions of the second to fourth collars 15 to 17 are omitted.

The first to fourth metal foam potions 21 to 24 are like portions, and hence a discussion is made below only as to the first metal foam portion 21 and discussions of the second to fourth metal foam portions 22 to 24 are omitted.

As shown in FIGS. 2 and 3, the first collar 14 includes a (metal) upper collar section 41 made of aluminum alloy inserted into the first mounting hole 37 from above, and a (metal) lower collar section 45 made of aluminum alloy inserted into the first mounting hole 37 from below. That is, the first collar 14 is halved into the upper and lower collar sections 41, 45.

The upper collar section 41 is formed by sintering an aluminum alloy powder, and includes an upper tubular portion 42 and an upper flange portion 43 protruding radially outwardly from an upper end 42a of the upper tubular portion 42.

The upper collar section 41 includes a portion 41a defined by an outer circumferential surface 42b of the upper tubular portion 42 and a lower surface 43a of the upper flange portion 43. At this portion (hereinafter referred to as "upper collar portion") 41a, the upper collar section 41 is joined to a circumferential edge 38 defining the first mounting hole 37 of the fiber reinforced resin member 12.

The lower collar section 45 is formed by sintering an aluminum powder as in the upper collar section 41, and includes a lower tubular portion 46 and a lower flange portion 47 protruding radially outwardly from a lower end 46a of the lower tubular portion 46.

The lower collar section 45 includes a portion 45a defined by an outer circumferential surface 46b of the lower tubular portion 46 and an upper surface 47a of the lower flange portion 47. At this portion (hereinafter referred to as "lower collar portion") 45a, the lower collar section 45 is joined to the circumferential edge 38.

The upper and lower collar sections 41, 45 have a through-hole 48 formed therethrough. The through-hole 48 is configured to allow insertion of a bolt (fastener) 65 (FIG. 1) therethrough.

It is noted that the upper collar section 41 and the lower collar section 45 are designated at different reference numerals for easy understanding of these sections although they may be identical.

The first metal foam portion 21 is made of aluminum metal foam (e.g., open-cell metal foam). The first metal foam portion 21 includes an upper metal foam section 51 formed in the upper collar section 41 and inserted into the first mounting hole 37 from above, and a lower metal foam section 55 formed in the lower collar section 45 and inserted into the first mounting hole 37 from below.

The upper metal foam section 51 has a multiplicity of pores 54 (FIG. 4) formed therein. The pores 54 are formed by forming aluminum alloy into metal foam integrally with the upper collar section 41 in forming the upper collar section 41.

The upper metal foam section 51 includes an upper tubular foam portion 52 formed on the outer circumferential surface 42b of the upper tubular portion 42, and an upper flange foam portion 53 protruding radially outwardly from an upper end 52a of the upper tubular foam portion 52 along the upper flange portion 43 (i.e., along the lower surface 43a).

That is, the upper metal foam section 51 is formed integrally with the upper collar portion 41a.

As in the upper metal foam section 51, the lower metal foam section 55 has a multiplicity of pores (not shown) formed therein. These pores are formed by forming aluminum alloy into metal foam integrally with the lower collar section 45 in forming the lower collar section 45.

The lower metal foam section 55 includes a lower tubular foam portion 56 formed on the outer circumferential surface 46b of the lower tubular portion 46, and a lower flange foam portion 57 protruding radially outwardly from a lower end 56a of the lower tubular foam portion 56 along the lower flange portion 47 (i.e., along the upper surface 47a).

That is, the lower metal foam section 55 is formed integrally with the lower collar portion 45a.

It is noted that the upper metal foam section 51 and the lower metal foam section 55 are designated at different reference numerals for easy understanding of these sections although they may be identical.

Figure 4:
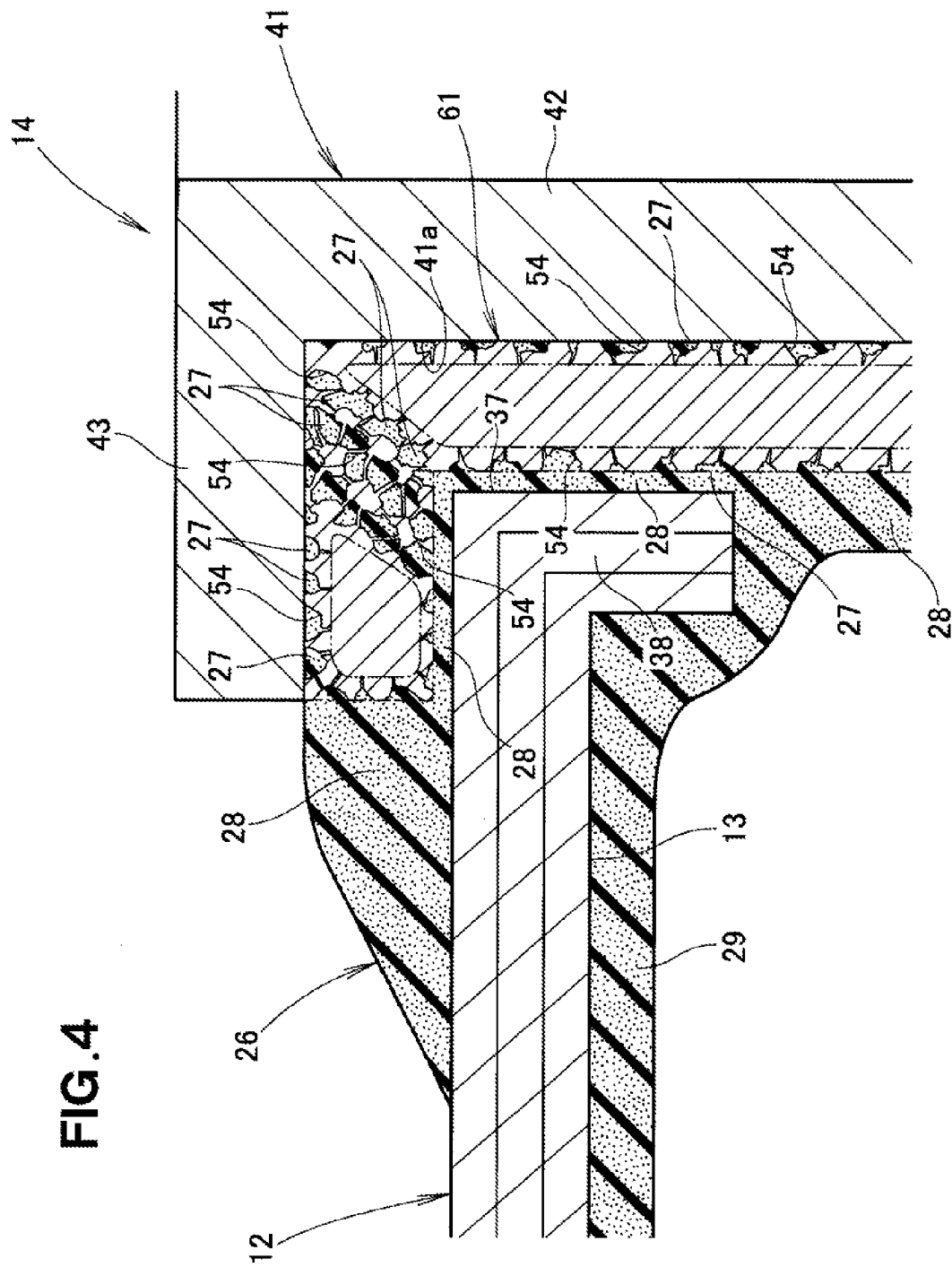
FIG. 4 is an enlarged view of part 4 of FIG. 2.

As shown in FIGS. 2 and 4, the resin portion 26 includes impregnation resins 27 impregnating the upper metal foam section 51, and a joining resin 28 contiguous with the resins 27 and joining the upper metal foam section 51 to the fiber reinforced resin member 12 (i.e., the circumferential edge 38), and a reinforcement resin 29 contiguous with the joining resin 28 and reinforcing the fiber reinforced resin member 12.

The circumferential edge 38 defines the first mounting hole 37 formed in the corner 12a of the fiber reinforced resin member 12.

The impregnation resins 27 fill the multiple pores 54 of the upper metal foam section 51. The upper metal foam section 51 and the impregnation resins 27 filling the pores 54 define an upper intermediate portion 61.

The upper intermediate portion 61 contains both aluminum alloy and resin, and thus has a coefficient of linear thermal expansion δ1 set to be between a coefficient of linear thermal expansion of aluminum alloy and a coefficient of linear thermal expansion of resin. This means that the coefficient of linear thermal expansion δ1 is set to be between the coefficient of linear thermal expansion δ2 of the upper collar section 41 and the coefficient of linear thermal expansion δ3 of the fiber reinforced resin member 12.

The upper intermediate portion 61 is interposed between the fiber reinforced resin member 12 (i.e., the circumferential edge 38) and the upper collar section 41 (i.e., the upper collar portion 41a) and is formed integrally with the upper collar section 41. Between the upper intermediate portion 61 and the circumferential edge 38 is interposed the joining resin 28.

The joining resin 28 is interposed (and fills a gap) between the upper metal foam section 51 and the fiber reinforced resin member 12 (i.e., the circumferential edge 38). The upper metal foam section 51 and the circumferential edge 38 are joined to each other by the joining resin 28 filling the gap therebetween.

That is, through the upper collar section 51 and the joining resin 28, the upper collar section 41 (i.e., the upper collar portion 41a) is joined to the circumferential edge 38.

The reinforcement resin 29 is disposed along an interior surface 13 of the fiber reinforced resin member 12. More specifically, the reinforcement resin 29 has a predetermined thickness on the interior surface 13 of the fiber reinforced resin member 12 which is of generally square-shaped closed cross-section.

The fiber reinforced resin member 12 is reinforced by the reinforcement resin 29 disposed on the interior surface 13 of the fiber reinforced resin member 12.

The reinforcement resin 29 can be easily formed along the interior surface 13 of the fiber reinforced resin member 12 in joining the upper collar section 41 (i.e., the upper collar portion 41a) to the upper metal foam section 51 by means of resin.

Turning back to FIGS. 1 and 2, the lower collar section 45 has the lower metal foam section 55 formed on the lower collar portion 45a in the similar manner to the upper collar section 41. The lower metal foam section 55 is joined to the fiber reinforced resin member 12 (i.e., the circumferential edge 38) through the joining resin 28. That is, through the lower metal foam section 55 and the joining resin 28, the lower collar portion 45a of the lower collar section 45 is joined to the circumferential edge 38.

In short, the first collar 14 is joined to the circumferential edge 38 through the joining resin 28.

The second collars 15 to fourth collars 17 are joined to the fiber reinforced resin member 12 through the joining resin 28, as in the first collar 14.

The bolts 65 are inserted through the first to fourth collars 14 to 17 with heads 65a protruding upwardly out of the first to fourth collars 14 to 17 and threadedly engaging nuts (fasteners) welded to a vehicle body (another structure) 68. It is noted that only one of the nuts is shown at reference numeral 66.

With the bolts and nuts, the fastening resin structure 10 is fastened to the vehicle body 68.

A discussion is made below as to a method for manufacturing the fastening resin structure 10, taking for example a method for joining the first collar 14 to the fiber reinforced resin member 12, with reference to FIGS. 3 and 4.

As shown in FIG. 3, the first collar 14 is formed to have the first metal foam portion 21 to be joined to the fiber reinforced resin member 12.

Figure 5A:
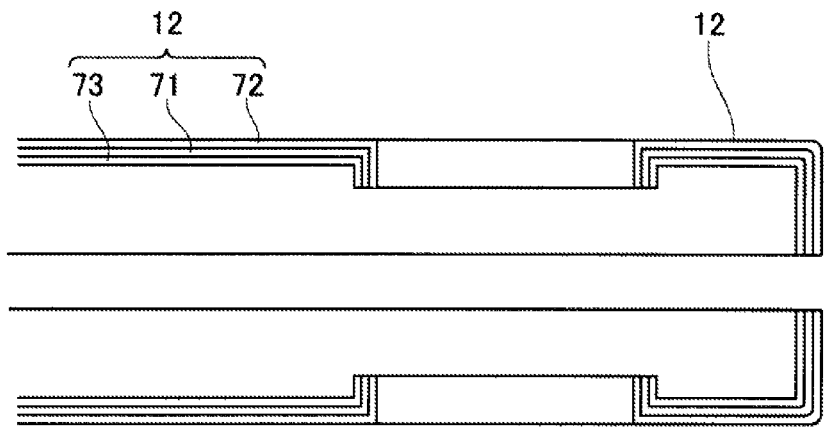
FIGS. 5A to 5C are views illustrating a method of manufacturing the fastening resin structure in the first embodiment.

As shown in FIG. 5A, the fiber reinforced resin member 12 is formed by laminating thermoplastic resin sheets 72, 73 on opposite sides of a continuous fiber mat 71 (e.g., a carbon fiber mat). The fiber reinforced resin member 12 is halved into upper and lower sections. The fiber reinforced resin member 12 thus halved is to be placed on a stationary mold member 77 of a mold 76.

Figure 5B:
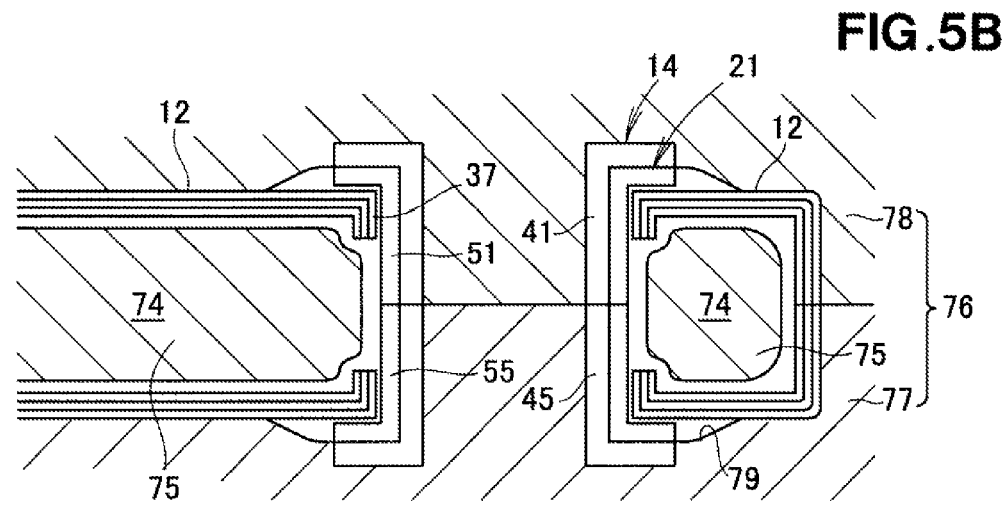

As shown in FIG. 5B, a core 75 is placed in an inner space 74 of the fiber reinforced resin member 12 during the placement of the fiber reinforced resin member 12 on the stationary mold member 77 of the mold 76.

After the placement of the fiber reinforced resin member 12 on the stationary mold member 77, the first collar 14 having the first metal foam portion 21 is placed into the first mounting hole 37 of the fiber reinforced resin member 12, after which a movable mold member 78 is moved to close the mold 76.

Figure 5C:
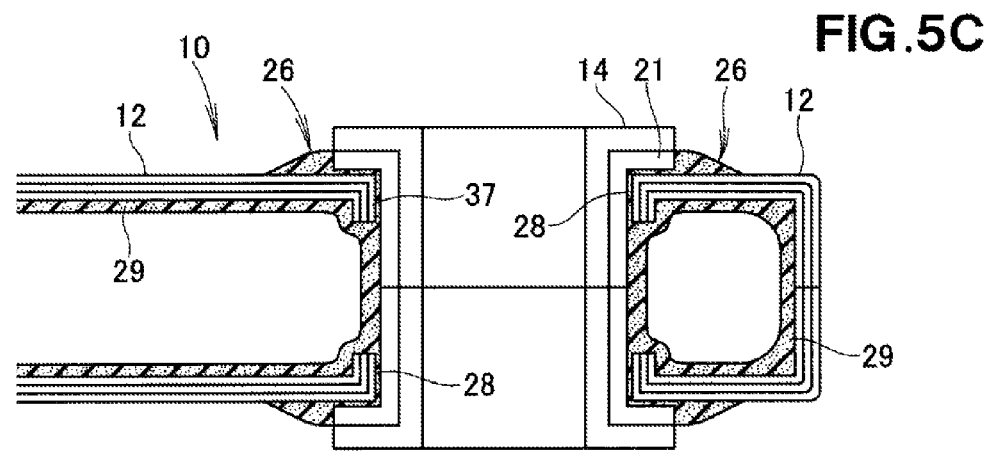

As shown in FIG. 5C, a resin is injected into a cavity 79 (FIG. 5B) of the mold 76 thus closed. The injected resin impregnates the first metal foam portion 21 as well as filling the cavity 79.

As a result, the resin portion 26 is formed (overmolded), such that the first metal foam portion 21 is joined to the fiber reinforced resin member 12 through the joining resin 28 of the resin portion 26, thereby manufacturing the fastening resin structure 10.

After the manufacturing of the fastening resin structure 10, the mold 76 (FIG. 5B) is opened and the fastening resin structure 10 is taken out of the opened mold 76. The core 75 (FIG. 5B) is removed from the fastening resin structure 10 thus taken out of the mold 76. This completes the process for manufacturing the fastening resin structure 10.

Since the first metal foam portion 21 is formed in the first collar 14, it becomes possible to join the first collar 14 to the fiber reinforced resin member 12 through the first metal foam portion 21 by the mere injection of the resin into the cavity 79. This makes it possible to easily manufacture the fastening resin structure 10, thereby keeping down the cost of the fastening resin structure 10.

A discussion is made below as to joining between the upper collar section 41 of the first collar 14 and the fiber reinforced resin member 12, with reference to FIG. 6.

It is noted that the lower collar section 45 of the first collar 14 and the second to fourth collars are joined to the fiber reinforced resin member 12 in the same manner as the upper collar section 41 of the first collar 14, and hence the joining of the lower collar section 45 and the second to fourth collars to the fiber reinforced resin member 12 is omitted.

Figure 6:
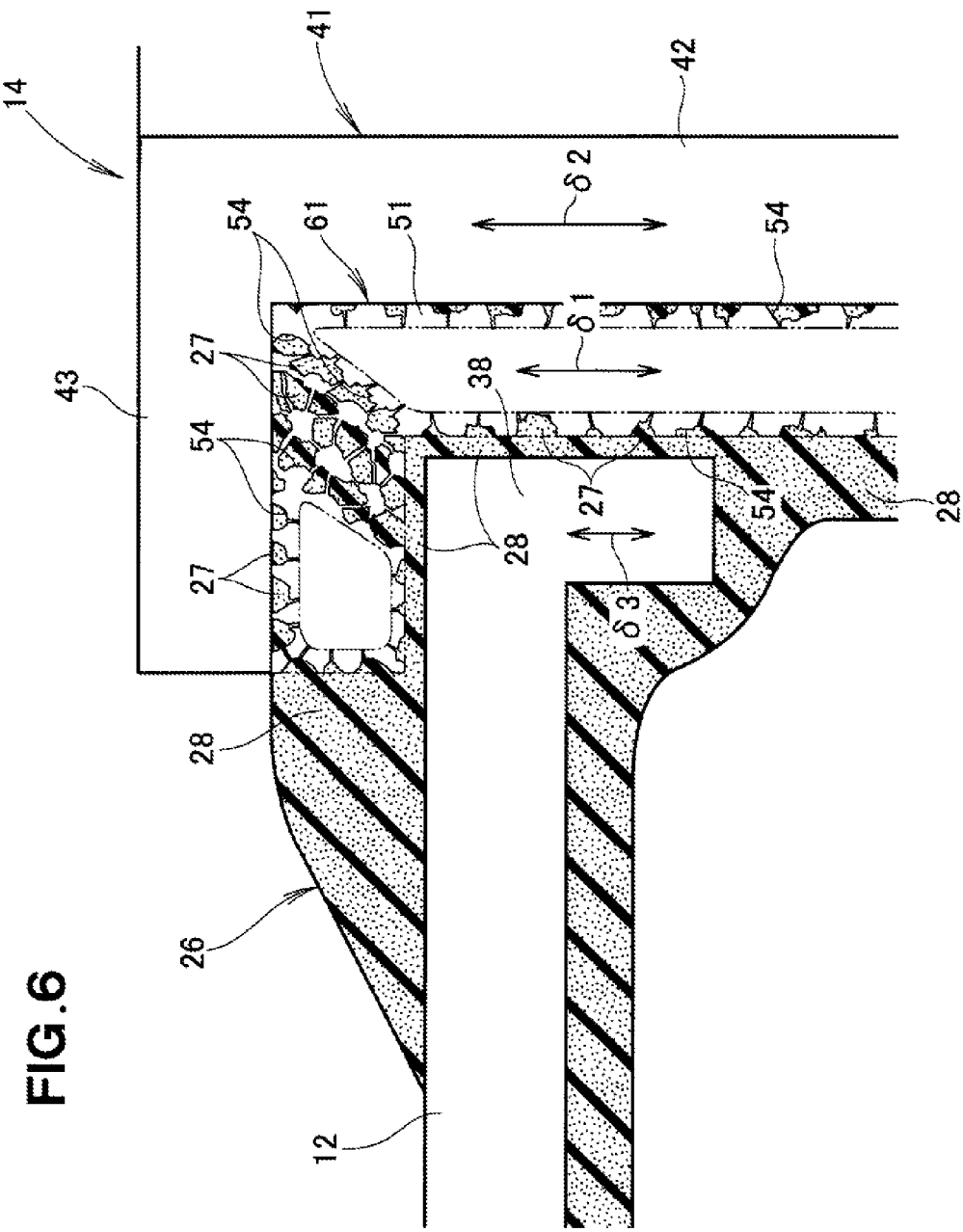
FIG. 6 is a view showing that the structure is designed to mitigate a stress produced in a joining resin portion of FIG. 4.

As shown in FIG. 6, the upper intermediate portion 61, interposed between the fiber reinforced resin member 12 and the upper collar section 41, is in contact with the joining resin 28.

The upper intermediate portion 61 contains both aluminum alloy and resin (impregnation resins 27) and thus has the coefficient of linear thermal expansion δ1 set to be between the coefficient of linear thermal expansion δ2 of the upper collar section 41 and the coefficient of linear thermal expansion δ3 of the fiber reinforced resin member 12.

That is, a difference (δ1−δ3) in the coefficient of linear thermal expansion between the upper intermediate portion 61 and the fiber reinforced resin member 12 (i.e., the circumferential edge 38) is smaller than a difference (δ1−δ2) in the coefficient of linear thermal expansion. As a result, a concentrated stress produced at the interface between the joining resin 28 and the upper collar section 41 due to a temperature change under a high or low temperature environment can be mitigated by the upper intermediate portion 61.

The upper metal foam portion 51 has an increased surficial area S1 due to the multiplicity of pores 54 formed therein. That is, without having to enlarge the overall size of the upper metal foam portion 51 (i.e., the upper collar section 41), it is possible to provide the upper metal foam portion 51 with an increased area S2 joined to the joining resin 28 (and the impregnation resins 27).

As is clear from the foregoing, in addition to providing the increased joined area S2 of the upper metal foam portion 51, it is possible for the upper intermediate portion 61, interposed between the fiber reinforced resin member 12 (i.e., the circumferential edge 38) and the upper collar section 41, to mitigate the stress generated at the interface between the joining resin 28 and the upper collar section 41.

With the increased area S2 of the upper metal foam portion 51 joined to the fiber reinforced resin member 12 through the joining resin 28, the joining resin 28 provides a sufficient joining strength (to firmly join the upper metal foam portion 51 to the resin member 28). This allows for downsizing of the aluminum-alloy upper collar section 41 to make the fastening resin structure 10 lightweight.

The upper collar section 41 downsized can be placed in a small space when the fastening resin structure 10 is to be fastened to another structure 68, as shown in FIG. 1. Since such a small space for placement of the downsized upper collar section 41 is easy to secure, the degree of freedom to design can be increased.

Discussions are made below as to fastening resin structures in second to fourth embodiments of the present invention, with reference to FIGS. 7 to 11. In the discussions of the fastening resin structures in the second to fourth embodiments of the present invention, like parts used in the fastening resin structure 10 in the first embodiment are designated at like reference numerals and discussions of these like parts are omitted.

A fastening resin structure 80 in the second embodiment is discussed below.

Figure 7:
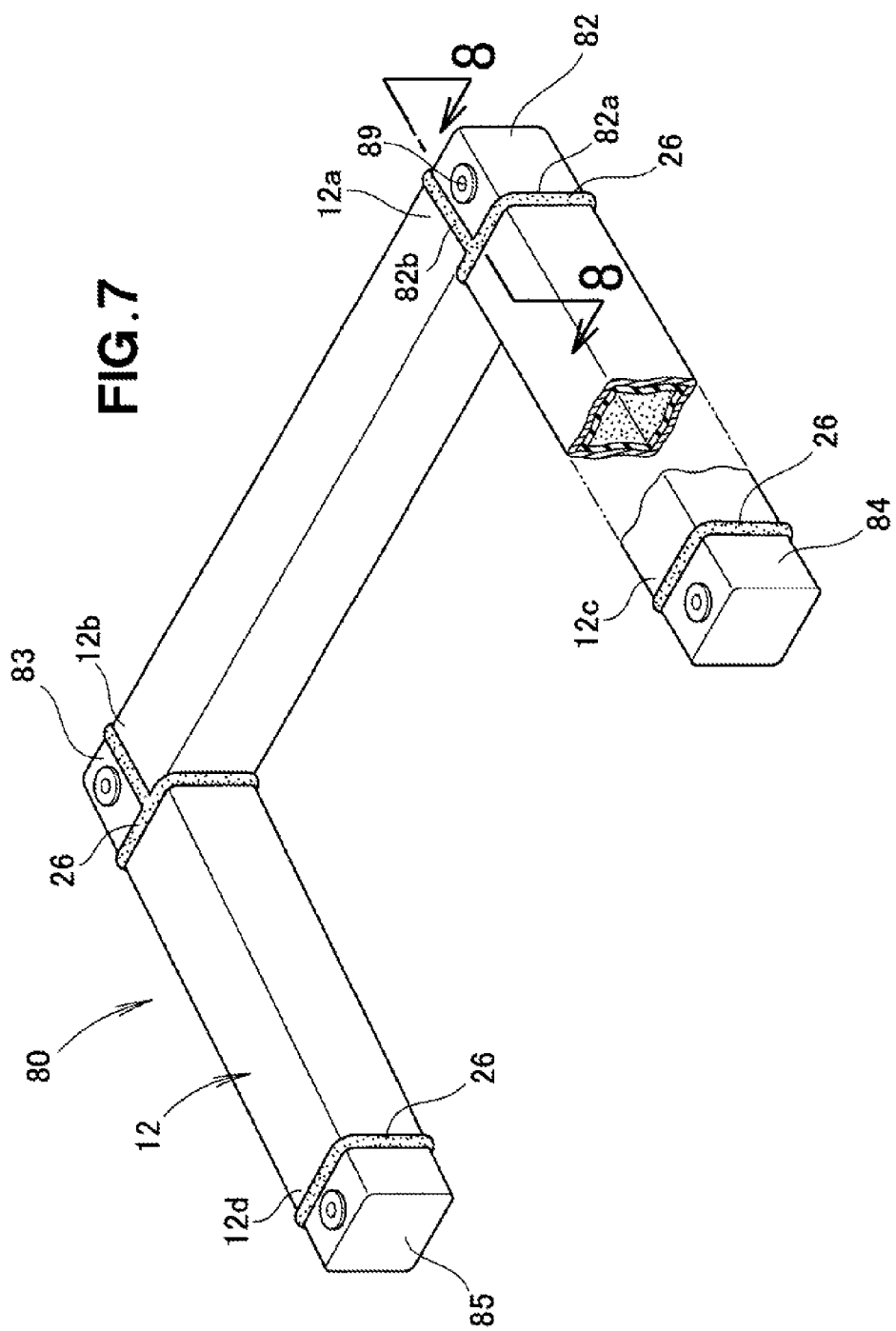
FIG. 7 is a perspective view of a fastening resin structure in a second embodiment of the present invention.

As shown in FIG. 7, the fastening resin structure 80 is substantially the same as the fastening resin structure 10 in the first embodiment except that the fastening resin structure 80 includes first to fourth blocks 82 to 85 (to-be-fastened, or fastener-receiving, parts) rather than the first to fourth collars 14 to 17 discussed in the first embodiment.

By means of metal foam portions 87 (FIG. 8), the first to fourth blocks 82 to 85 are disposed at the opposite corners 12a, 12b and opposite end portions 12c, 12d of the fiber reinforced resin member 12.

It is noted that the first to fourth blocks 82 to 85 are similar to one another and hence a discussion is made below as to the first block 82 only and discussions of the second to fourth blocks 82 to 85 are omitted.

Figure 8:
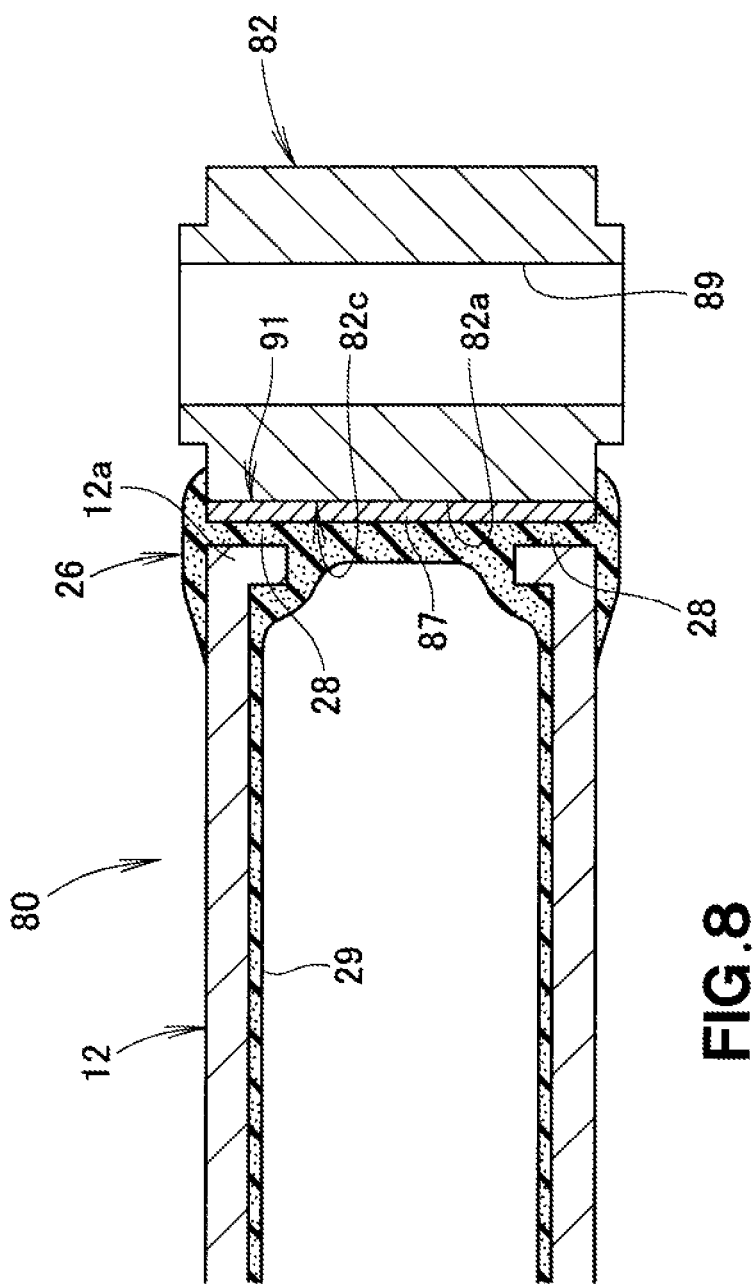
FIG. 8 is a cross-sectional view taken along 8-8 of FIG. 7.

As shown in FIG. 8, the first block 82 is formed by sintering an aluminum alloy powder into a generally rectangular shape. The first block 82 has a through-hole 89 formed therethrough to allow insertion of the bolt 65 (FIG. 1) into the through-hole 89.

The first block 82 has first and second block surfaces 82a, 82b (FIG. 7) having a portion 82c to be joined to the one corner 12a of the fiber reinforced resin member 12. The portion 82c is hereinafter referred to as a "block portion 82c".

The metal foam portion 87 has a multiplicity of pores formed therein. The pores are formed by forming aluminum alloy into metal foam (e.g., open-cell metal foam) integrally with the first block 82 in forming the first block 82.

The metal foam portion 87 is formed integrally with the block portion 82c of the first block 82.

The metal foam portion 87 and the fiber reinforced resin member 12 (i.e., the one corner 12a) are joined to each other through the joining resin 28 of the resin portion 26.

The multiple pores of the metal foam portion 87 are filled with the impregnation resins 27 (FIG. 4). The metal foam portion 87 and the impregnation resins 27 define an intermediate portion 91.

The intermediate portion 91 contains both aluminum alloy and resin. Thus, a coefficient of linear thermal expansion of the intermediate portion 91 is set to be between a coefficient of linear thermal expansion of aluminum alloy and a coefficient of linear thermal expansion of resin (i.e., between a coefficient of linear thermal expansion of the first block 82 and a coefficient of linear thermal expansion of the fiber reinforced resin member 12).

The intermediate portion 91 is interposed between the fiber reinforced resin member 12 (i.e., the one corner 12a) and the first block 82 and formed integrally with the first block 82. The joining resin 28 is interposed between the intermediate portion 91 and the one corner 12a.

Thus, a difference in the coefficient of linear thermal expansion between the intermediate portion 91 and the one corner 12a is small. As a result, a concentrated stress produced at the interface between the joining resin 28 and the first block 82 due to a temperature change under a high or low temperature environment can be mitigated by the intermediate portion 91.

The metal foam portion 87 has an increased surficial area due to the multiplicity of pores formed therein. That is, without having to enlarge the overall size of the metal foam portion 87 (i.e., the first block 82), it is possible to provide the metal foam portion 87 with an increased area joined to the joining resin 28 (and the impregnation resins 27).

As is clear from the foregoing, in addition to providing the increased joined area of the metal foam portion 87, it is possible for the intermediate portion 91, interposed between the fiber reinforced resin member 12 (i.e., the one corner 12a) and the first block 82, to mitigate the stress generated at the interface between the joining resin 28 and the first block 82.

With the increased joined area of the metal foam portion 87 joined to the one corner 12a through the joining resin 28, the joining resin 28 provides a sufficient joining strength (to firmly join the metal foam portion 87 to the one corner 12a). This allows for downsizing of the aluminum-alloy first block 82 to make the fastening resin structure 80 lightweight.

The first block 82 downsized can be placed in a small space when the fastening resin structure 80 shown in FIG. 7 is to be fastened to another structure 68 (FIG. 1). Since such a small space for placement of the downsized first block 82 is easy to secure, the degree of freedom to design can be increased.

The fastening resin structure 80 can be manufactured in the same manner as the fastening resin structure 10 in the first embodiment.

Since the fastening resin structure 80 can be easily manufactured, the cost of the fastening resin structure 80 may be low.

That is, the fastening resin structure 80 has the same advantageous result as the fastening resin structure 10 in the first embodiment.

In the second embodiment, since the metal structure such as the first block 82 is joined to the resin member, the fastening resin structure can be put in various uses.

A fastening resin structure 100 in the third embodiment is discussed below.

Figure 9:
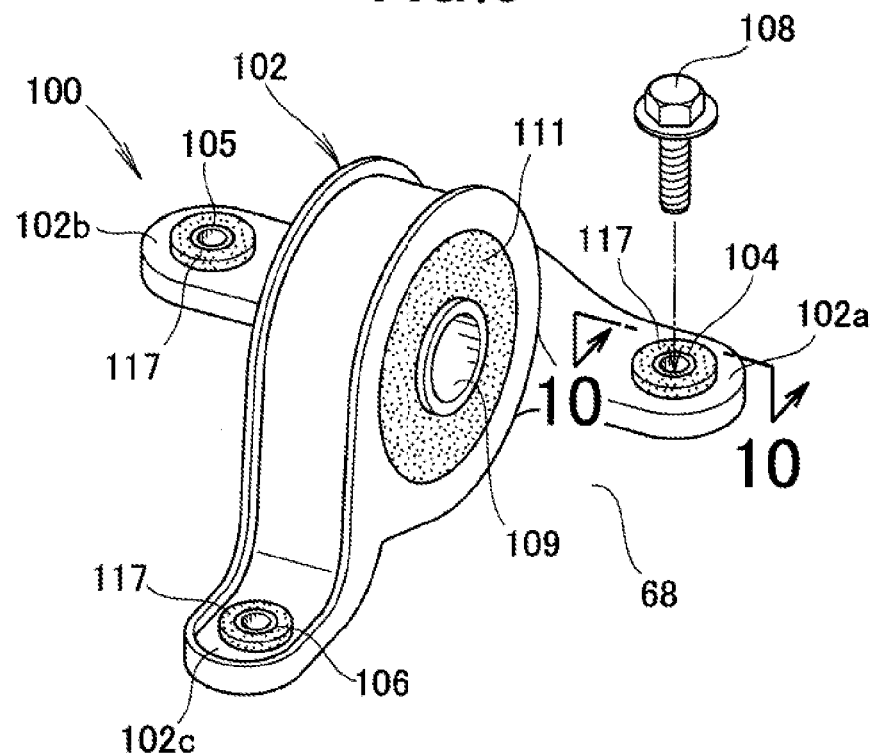
FIG. 9 is a perspective view of a fastening resin structure in a third embodiment of the present invention.

As shown in FIG. 9, the fastening resin structure 100 is substantially the same as the fastening resin structure 10 in the first embodiment except that the fastening resin structure 100 includes an injection-molded resin member 102 rather than the fiber reinforced resin member 12.

The resin member 102 is an injection-molded resin-made member mountable to the vehicle body 68. At first to third end portions 102a to 102c of the resin member 102 are disposed first to third collars 104 to 106 (to-be-fastened, or fastener-receiving, parts).

It is noted that the first to third collars 104 to 106 are similar to one another and hence a discussion is made below as to the first collar 104 only and discussions of the second and third collars 105, 106 are omitted.

Bolts (fasteners) 108 (only one shown) are inserted through the first to third collars 104 to 106 and fastened to the vehicle body 68 to thereby fasten (attach) the fastening resin structure 100 to the vehicle body 68.

A bolt is inserted through a support collar 109 of the fastening resin structure 100 and threadedly engaged with an engine etc. such that the engine etc. is supported by the fastening resin structure 100.

The support collar 109 is disposed in the resin member 102 with an elastic member 111 interposed therebetween.

Figure 10:
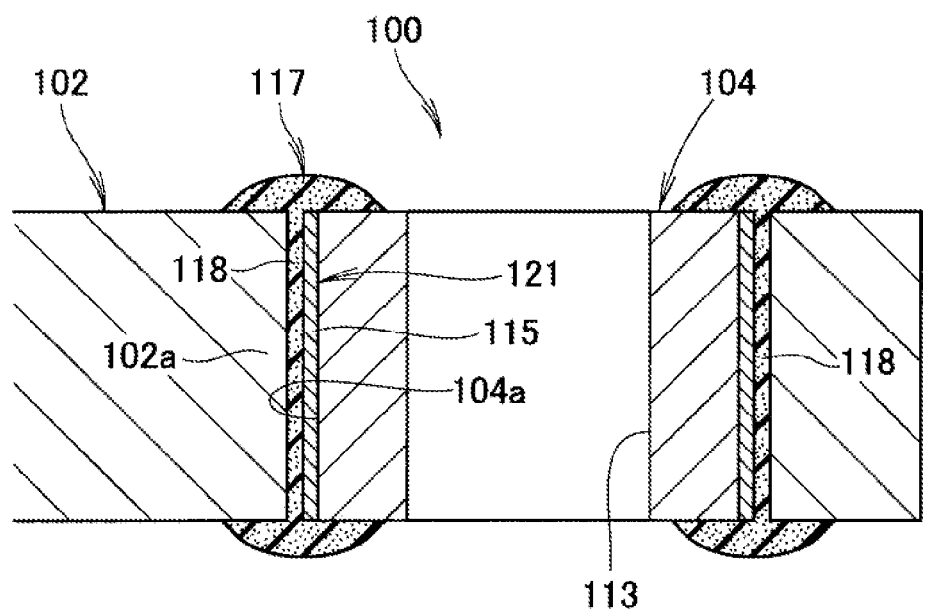
FIG. 10 is a cross-sectional view taken along 10-10 of FIG. 9.

As shown in FIG. 10, the first collar 104 is formed by sintering an aluminum alloy powder into a tubular shape, and has a through-hole 113 formed therethrough to allow insertion of the bolt 108 (FIG. 9) into the through-hole 113.

The first collar 104 has an outer circumferential surface defining a portion 104a to be joined to the first end portion 102a of the resin member 102. The portion 104a is hereinafter referred to as a "collar portion 104a".

A metal foam portion 115 has a multiplicity of pores formed therein. The pores are formed by forming aluminum alloy into metal foam (e.g., open-cell metal foam) integrally with the first collar 104 in forming the first collar 104.

The metal foam portion 115 is formed integrally with the collar portion 104a of the first collar 104.

The metal foam portion 115 and the resin member 102 (i.e., the first end portion 102a) are joined to each other through a joining resin 118 of a resin portion 117.

The multiple pores of the metal foam portion 115 are filled with impregnation resins (like the impregnation resins 27 shown in FIG. 4). The metal foam portion 115 and the impregnation resins define an intermediate portion 121.

The intermediate portion 121 contains both aluminum alloy and resin. Thus, a coefficient of linear thermal expansion of the intermediate portion 121 is set to be between a coefficient of linear thermal expansion of aluminum alloy and a coefficient of linear thermal expansion of resin (i.e., between a coefficient of linear thermal expansion of the first collar 104 and a coefficient of linear thermal expansion of the resin member 102).

The intermediate portion 121 is interposed between the resin member 102 (i.e., the first end portion 102a) and the first collar 104 and formed integrally with the first collar 104. The joining resin 118 is interposed between the intermediate portion 121 and the first end portion 102a.

Thus, a difference in the coefficient of linear thermal expansion between the intermediate portion 121 and the first end portion 102a is small. As a result, a concentrated stress produced at the interface between the joining resin 118 and the first collar 104 due to a temperature change under a high or low temperature environment can be mitigated by the intermediate portion 121.

The metal foam portion 115 has an increased surficial area due to the multiplicity of pores formed therein. The metal foam portion 115 of the increased surficial area is impregnated with the impregnation resins. That is, without having to enlarge the overall size of the metal foam portion 115 (i.e., the first collar 104), it is possible to provide the metal foam portion 115 with an increased area joined to the joining resin 118 (and the impregnation resins).

As is clear from the foregoing, in addition to providing the increased joined area of the metal foam portion 115, it is possible for the intermediate portion 121, interposed between the resin member 102 (i.e., the one end portion 102a) and the first collar 104, to mitigate the stress generated at the interface between the joining resin 118 and the first collar 104.

With the increased joined area of the metal foam portion 115 joined to the first end portion 102a through the joining resin 118, the joining resin 118 provides a sufficient joining strength (to firmly join the metal foam portion 115 to the first end portion 102a). This allows for downsizing of the aluminum-alloy first collar 104 to make the fastening resin structure 100 lightweight.

The first collar 104 downsized can be placed in a small space when the fastening resin structure 100 shown in FIG. 9 is to be fastened to another structure 68 (FIG. 9). Since such a small space for placement of the downsized first collar 104 is easy to secure, the degree of freedom to design can be increased.

The fastening resin structure 100 can be manufactured in the same manner as the fastening resin structure 10 in the first embodiment.

Since the fastening resin structure 100 can be easily manufactured, the cost of the fastening resin structure 100 may be low.

That is, the fastening resin structure 100 has the same advantageous result as the fastening resin structure 10 in the first embodiment.

In the third embodiment, since the metal members (the first to third collars 104 to 106) are joined to the injection-molded resin member 102, the fastening resin structure can be put in various uses.

A fastening resin structure 130 in a fourth embodiment is discussed below.

Figure 11:
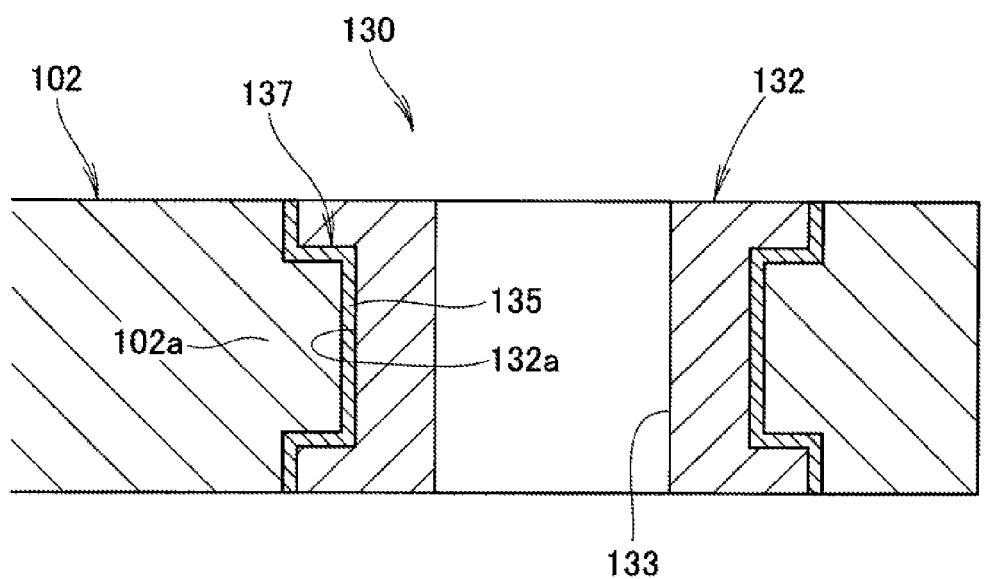
FIG. 11 is a perspective view of a fastening resin structure in a fourth embodiment of the present invention.

As shown in FIG. 11, the fastening resin structure 130 is substantially the same as the fastening resin structure 100 in the third embodiment except that the fastening resin structure 130 includes a first collar 132 (to-be-fastened, or fastener-receiving, part) rather than the first collar 104 in the third embodiment, and the resin member 102 of the structure 130 doubles as the joining resin 118.

The first collar 132 is formed by sintering an aluminum alloy powder into a tubular shape, and has a through-hole 133 formed therethrough to allow insertion of the bolt 108 (FIG. 9) into the through-hole 133.

The first collar 132 has an outer circumferential surface defining a portion 132a to be joined to the first end portion 102a of the resin member 102. The portion 132a is hereinafter referred to as a "collar portion 132a".

A metal foam portion 135 has a multiplicity of pores formed therein. The pores are formed by forming aluminum alloy into metal foam (e.g., open-cell metal foam) integrally with the first collar 132 in forming the first collar 132.

The metal foam portion 135 is formed integrally with the collar portion 132a of the first collar 132.

The fastening resin structure 130 is formed by placing in a cavity of a mold the first collar 132 having the metal foam portion 135, closing the mold, and filling the cavity with resin to form the resin member 102. During the filling of the cavity with the resin, a portion of the resin fills the multiple of pores, as do the impregnation resins 27. The metal foam portion 135 and the resin portion filling the pores define an intermediate portion 137.

The metal foam portion 135 with the pores filled with the resin portion is joined to the resin member 102 (i.e., the first end portion 102a).

Since, as in the fastening resin structure 10 in the first embodiment, the fastening resin structure 130 has the first metal foam portion 135 formed in the first collar 132, it becomes possible to join the first collar 132 to the resin member 102 through the first metal foam portion 135 by the mere injection of the resin into the mold cavity. This makes it possible to easily manufacture the fastening resin structure 130 in the same manner as the fastening resin structure 10 in the first embodiment, thereby keeping down the cost of the fastening resin structure 130.

The intermediate portion 137, which is defined by the metal foam portion 135 and the resin portion filling the pores of the metal foam portion 135, contains both aluminum alloy and resin. Thus, a coefficient of linear thermal expansion of the intermediate portion 137 is set to be between a coefficient of linear thermal expansion of aluminum alloy and a coefficient of linear thermal expansion of resin (i.e., between a coefficient of linear thermal expansion of the first collar 132 and a coefficient of linear thermal expansion of the resin member 102).

The intermediate portion 137 is interposed between the resin member 102 (i.e., the first end portion 102a) and the first collar 132 and formed integrally with the first collar 132.

Thus, a difference in the coefficient of linear thermal expansion between the intermediate portion 137 and the first end portion 102a is small. As a result, a concentrated stress produced at the interface between the resin member 102 and the first collar 132 due to a temperature change under a high or low temperature environment can be mitigated by the intermediate portion 137.

The metal foam portion 135 has an increased surficial area due to the multiplicity of pores formed therein. The metal foam portion 135 of the increased surficial area is impregnated with the resin portion. That is, without having to enlarge the overall size of the metal foam portion 135 (i.e., the first collar 132), it is possible to provide the metal foam portion 135 with an increased area joined to the resin member 102 (and the resin portion).

As is clear from the foregoing, in addition to providing the increased joined area of the metal foam portion 135, it is possible for the intermediate portion 137, interposed between the resin member 102 (i.e., the one end portion 102a) and the first collar 132, to mitigate the stress generated at the interface between the resin member 102 and the first collar 132.

With the increased joined area of the metal foam portion 135 joined to the first end portion 102a, the resin member 102 provides a sufficient joining strength (to firmly join the metal foam portion 135 to the first end portion 102a). This allows for downsizing of the aluminum-alloy first collar 132 to make the fastening resin structure 130 lightweight.

The first collar 132 downsized can be placed in a small space when the fastening resin structure 130 is to be fastened to another structure 68 (FIG. 9). Since such a small space for placement of the downsized first collar 132 is easy to secure, the degree of freedom to design can be increased.

That is, the fastening resin structure 130 has the same advantageous result as the fastening resin structure 10 in the first embodiment.

In the fourth embodiment, since the metal members (only the first collar 132 shown) are joined to the injection-molded resin member 102, the fastening resin structure can be put in various uses.

It is noted that the fastening resin structure and the method for manufacturing the structure may be modified or changed without being limited to those discussed above.

For example, although the fiber reinforced resin member 12 is a unitary member formed to have a generally U-shaped configuration as viewed in plan in the first embodiment, three separate linear members may be joined to one another to provide the fiber reinforced resin member having a generally U-shaped configuration as viewed in plan.

It is noted that porosities of the pores 54 of the metal foam portions 21 to 24, 87, 115, 135 in the first to fourth embodiments may vary to change a mechanical property and coefficient of linear thermal expansion of the metal foam portion.

Although the metal foam portions 21 to 24, 87, 115, 135 in the first to fourth embodiments are made from aluminum alloy, they may be made from other foamable materials such as magnesium materials, steel materials and SiC (Silicon Carbide).

It is noted that the resin portions 26 and 117 in the first to fourth embodiments may be made from either of thermoplastic and thermosetting resins because these resins have fluidity to impregnate the metal foam portions 21 to 24, 87, 115, 135 in forming the resin portions 26 and 117.

Although the vehicle body 68 is discussed as another structure to which each of the fastening resin structures in the first to fourth embodiments is to be attached (fastened), the respective fastening resin structures may be attached to structures other than the vehicle body 68.

Although the metal foam portions 21 to 24, 87, 115, 135 are formed integrally with the collars in sintering an aluminum alloy powder to form the collars in the first to fourth embodiments, another method may be employed to form the metal foam portions. For example, molten metal may be solidified into the metal foam portions.

It is noted that the fastening resin structures, the fiber reinforced resin members, the first to fourth collars, the first to fourth metal foam portions, the resin portion, the impregnation resins, the joining resin, the reinforcement resin, the upper and lower collar portions, the vehicle body, the mold, the mold cavity, the first to fourth blocks, the block portion, the metal foam portions, the resin member, and the collar portion in the first to fourth embodiments may have shapes or forms other than those discussed in the first to fourth embodiments.

The present invention is suitable for an automobile having a resin member and a metal portion joined to the resin member, the metal portion being capable of being fastened to another structure through fasteners.

Obviously, various minor changes and modifications of the present invention are possible in the light of the above teaching. It is therefore to be understood that within the scope of the appended claims the invention may be practiced otherwise than as specifically described.

What is claimed is:

1. A fastening resin structure comprising:
   a preformed resin member;
   a fastener-receiving part of metal configured to be fastened to another structure, the fastener-receiving part having a portion joined to the preformed resin member;
   a foam portion provided directly on and formed integrally with the portion of the fastener-receiving part which is joined to the preformed resin member, the foam portion being spaced from the preformed resin member; and
   a joining resin interposed between the preformed resin member and the foam portion and having a portion impregnated in the foam portion to thereby join the preformed resin member and the fastener-receiving part via the resin-impregnated foam portion.

2. The fastening resin structure according to claim 1, wherein the preformed resin member is made of a fiber reinforced plastic, the fastener-receiving part is made of a sintered metal, and the foam portion is made of a foam metal, the foam portion is formed integrally with the portion of the fastener-receiving part which is joined with the preformed resin member.

3. The fastening resin structure according to claim 2, wherein the metal foam is an open-cell metal foam.

4. The fastening resin structure according to claim 1, wherein the joining resin further comprises a reinforcement portion extending over part of the preformed resin member to reinforce the preformed resin member.

5. The fastening resin structure according to claim 1, wherein the preformed resin member has a mounting hole, the fastener-receiving part comprises a metal collar having an outer circumferential surface, and the foam portion comprises a foam metal provided on and formed integrally with the outer circumferential surface of the metal collar, the metal collar and the form metal being disposed concentrically in the mounting hole with an annular space defined between an outer circumferential surface of the foam metal and an inner circumferential surface of the mounting hole, and the annular space is filled with the joining resin.

6. The fastening resin structure according to claim 5, wherein the metal collar has a flange extending radially outwardly from an axial end of the metal collar, the foam metal has a flange formed integrally on an inner surface of the flange of the metal collar and facing toward a surface of the preformed resin member extending perpendicular to an axis of the mounting hole, and the joining resin has a portion interposed between the surface of the preformed resin member and the flange of the formed metal and impregnated with the flange of the foam metal.

7. The fastening resin structure according to claim 5, wherein the preformed resin member has a hollow shape, and the joining resin includes a reinforcement resin part disposed on an interior surface of the hollow preformed resin member.

8. The fastening resin structure according to claim 1, wherein the fastener-receiving part comprises a metal block having a through-hole formed therein and having a side joined to a part of the preformed resin material, the foam portion comprises a foam metal provided on and formed integrally with the side of the metal block, and the joining resin is interposed between the foam metal and the preformed resin member and has a portion impregnated in the foam metal to thereby join the metal block and the preformed resin member via the resin-impregnated foam metal.

9. The fastening resin structure according to claim 8, wherein the preformed resin member has a hollow shape, and the joining resin includes a reinforcement resin part disposed on an interior surface of the hollow shape preformed resin member.

10. A method of manufacturing a fastening resin structure, comprising the steps of:
    providing a preformed resin member, a fastener-receiving part of metal having a portion to be joined to the preformed resin member, and a foam portion provided directly on and formed integrally with the portion of the fastener-receiving part which is to be joined to the preformed resin member;

setting the preformed resin member, the fastener-receiving part and the foam portion in a cavity of a mold with a space defined between the preformed resin member and the foam portion, the cavity being complementary in shape with a fastening resin structure to be manufactured; and injecting a resin into the cavity of the mold:

to fill the space with the resin to thereby separate the foam portion from the resin member in the fastening resin structure; and also to form a joining resin between the preformed resin member and the foam portion and having a portion impregnated in the foam portion to thereby join the preformed resin member and the fastener-receiving part via the resin-impregnated foam portion.

11. The method according to claim 10, wherein the preformed resin member is made of a fiber reinforced plastic, the fastener-receiving part is made of a sintered metal, and the foam portion is made of a metal foam, and the foam portion is formed integrally with the portion of the fastener-receiving part which is to be joined with the preformed resin member.

12. The method according to claim 11, wherein the metal foam is an open-cell metal foam.

* * * * *